United States Patent
Seki et al.

(10) Patent No.: US 11,988,682 B2
(45) Date of Patent: May 21, 2024

(54) TRANSFER SYSTEM AND AUTOMATIC ANALYSIS SYSTEM

(71) Applicant: SHIMADZU CORPORATION, Kyoto (JP)

(72) Inventors: Katsuhiko Seki, Kyoto (JP); Hikaru Shibata, Kyoto (JP); Hiroyuki Matsumoto, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 157 days.

(21) Appl. No.: 17/555,601

(22) Filed: Dec. 20, 2021

(65) Prior Publication Data

US 2022/0236296 A1   Jul. 28, 2022

(30) Foreign Application Priority Data

Jan. 25, 2021   (JP) ................. 2021-009266

(51) Int. Cl.
  *G01N 35/04* (2006.01)
  *G01N 35/02* (2006.01)
  (Continued)

(52) U.S. Cl.
  CPC ........... *G01N 35/04* (2013.01); *G01N 35/025* (2013.01); *G01N 35/026* (2013.01); *G01N 35/10* (2013.01); *G01N 2030/027* (2013.01)

(58) Field of Classification Search
  CPC .... G01N 35/04; G01N 35/025; G01N 35/026; G01N 2030/027; G01N 30/24;
  (Continued)

(56) References Cited

U.S. PATENT DOCUMENTS

2001/0048894 A1\* 12/2001 Schmidt ............. G01N 35/1097
                                                                  422/63
2013/0274913 A1   10/2013 Wilson et al.
(Continued)

FOREIGN PATENT DOCUMENTS

JP        57-37263 A       3/1982
JP        63-188759 A      8/1988
(Continued)

OTHER PUBLICATIONS

Japanese Office Action issued Jan. 16, 2024 in Application No. 2021-009266.

*Primary Examiner* — Jill A Warden
*Assistant Examiner* — John McGuirk
(74) *Attorney, Agent, or Firm* — Sughrue Mion, PLLC (57) ABSTRACT

A transfer system (1) is a transfer system (1) that transfers a sample container (S) containing a sample from a transfer source device (100) to a transfer destination device (200) disposed adjacent to the transfer source device (100), and the transfer system (1) includes an arm (2) having a distal end and a proximal end, the distal end portion facing the transfer destination device (200), and a first catcher (4) for detachably holding the sample container (S) at the distal end, a drive mechanism (14) provided in the transfer source device (100) and configured to drive the arm (2) to move the first catcher (4) between a first position in the transfer source device (100) and a second position in the transfer destination device (200), and a second catcher (16) provided in the transfer destination device (200) and provided so that the sample container (S) is delivered and received between the first catcher (4) and the second catcher (16) when the first catcher (4) reaches the second position.

8 Claims, 5 Drawing Sheets

(51) Int. Cl.
*G01N 35/10* (2006.01)
*G01N 30/02* (2006.01)

(58) Field of Classification Search
CPC ... G01N 2030/8804; G01N 2035/0406; G01N 30/02; G01N 35/10; G01N 2035/0467; B65G 37/005; B65G 47/52
See application file for complete search history.

(56) References Cited

U.S. PATENT DOCUMENTS

| | | |
|---|---|---|
| 2017/0045541 A1* | 2/2017 | Cohen .................... G01N 35/04 |
| 2017/0168027 A1 | 6/2017 | Hanafusa et al. |
| 2018/0180634 A1* | 6/2018 | Lair ..................... G01N 35/021 |
| 2018/0259545 A1* | 9/2018 | Katsumi ................ G01N 35/04 |
| 2018/0326376 A1* | 11/2018 | Beauducel ....... G01N 35/00732 |
| 2019/0204304 A1 | 7/2019 | Shiba et al. |

FOREIGN PATENT DOCUMENTS

| | | |
|---|---|---|
| JP | 3-72355 U | 7/1991 |
| JP | 3178839 U | 10/2012 |
| JP | 2015-514215 A | 5/2015 |
| JP | 2019-120509 A | 7/2019 |
| WO | 2016/017042 A1 | 2/2016 |

* cited by examiner

TRANSFER SYSTEM AND AUTOMATIC ANALYSIS SYSTEM

BACKGROUND OF THE INVENTION

1. Field of the Invention

The present invention relates to a transfer system and an automatic analysis system.

2. Description of the Related Art

In some cases, an automatic analysis system in which a preprocessing device that performs a preprocess of a sample such as whole blood, serum, plasma, or urine, and an analysis device such as a liquid chromatograph that performs an analysis of a sample subjected to a predetermined preprocess in the preprocessing device are combined, and a series of operations from the preprocess to the analysis of the sample is fully automatically performed is constructed (see, Patent Literature 1).

The automatic analysis system as described above requires a transfer system that transfers a sample subjected to the preprocess in a preprocessing device to an analysis device. The transfer system includes an arm that holds and conveys a sample container containing a sample, and is configured to place the sample container at a predetermined position in an autosampler of the analysis device by the arm. The autosampler of the analysis device collects a sample from a sample container disposed at a predetermined position by an arm of a transfer system using a needle.

CITATION LIST

Patent Literature

Patent Literature 1: WO 2016/017042 A

SUMMARY OF THE INVENTION

In the autosampler of the analysis device, it is desirable that the internal space is sealed and thermally isolated from the outside air in order to maintain the temperature of the sample constant. On the other hand, in order to enable the transfer system to transfer the sample container from the preprocessing device to the autosampler, the arm of the transfer system is required to be able to access the autosampler from the preprocessing device. Therefore, an opening and closing door that is opened only while the arm of the transfer system moves the sample container into the autosampler is provided on the side face of the autosampler.

While the sample is collected from the sample container in the autosampler, the arm of the transfer device holding the sample container waits in a state of accessing the internal space of the autosampler. Meanwhile, since the opening and closing door of the autosampler is opened, there is a problem that the internal space of the autosampler is exposed to the outside air, the temperature of the internal space of the autosampler fluctuates, and dew condensation occurs or power consumption increases. In addition, when the arm of the transfer device accesses the inside of the autosampler, the arm may interfere with the mechanism of the autosampler and inhibit the operation of the autosampler.

Therefore, an object of the present invention is to shorten the time during which the arm of a transfer system accesses the inside of a transfer destination device.

A transfer system according to the present invention is a transfer system that transfers a sample container containing a sample from a transfer source device to a transfer destination device disposed adjacent to the transfer source device, and the transfer system includes an arm having a distal end and a proximal end, the distal end facing the transfer destination device, the arm having, at a distal end portion, a first catcher for detachably holding the sample container, a drive mechanism that is provided in the transfer source device and is configured to move the first catcher between a first position in the transfer source device and a second position in the transfer destination device by driving the arm, and a second catcher that is provided in the transfer destination device, and the second catcher being provided so that the sample container is delivered and received between the second catcher and the first catcher when the first catcher reaches the second position.

An automatic analysis system according to the present invention includes a transfer source device, a transfer destination device disposed adjacent to the transfer source device, and a transfer system described above that transfers a sample container containing a sample from the transfer source device to the transfer destination device.

The transfer system according to the present invention has a configuration in which a first catcher provided at the distal end of the arm detachably holds the sample container, and when the arm reaches a second position in the transfer destination device, the sample container is delivered and received between the first catcher at the distal end of the arm and the second catcher provided in the transfer destination device. With such a configuration, after the sample container is delivered from the first catcher to the second catcher, the arm can be retracted to the transfer source device side with the sample container left in the transfer destination device, and the time during which the arm of the transfer system accesses the inside of the transfer destination device can be shortened.

In the analysis system according to the present invention, since the above-described transfer system is used as a transfer system that transfers the sample container between the transfer source device and the transfer destination device, it is possible to shorten the time during which the arm of the transfer system accesses the inside of the transfer destination device. As a result, after the arm of the transfer system is retracted to the transfer source device, the internal space of the transfer destination device can be sealed, and the time during which the internal space of the transfer destination device is exposed to the outside air can be shortened.

DETAILED DESCRIPTION OF THE INVENTION

Hereinafter, an embodiment of a transfer system and an automatic analysis system according to the present invention will be described with reference to the drawings.

Figure 1:
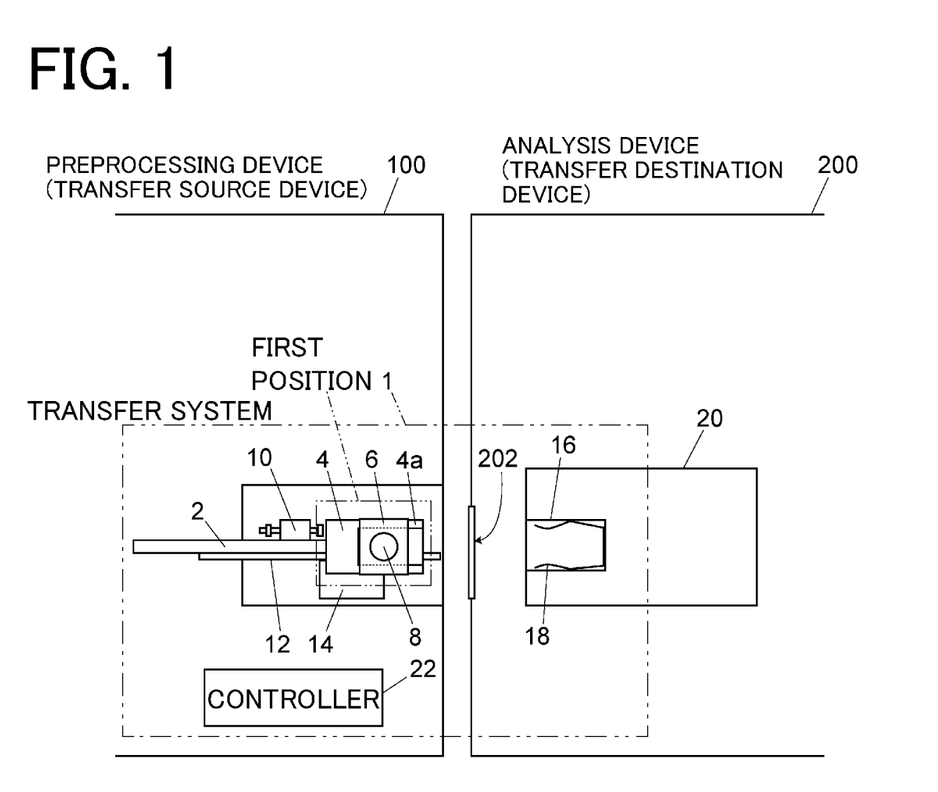
FIG. 1 is a schematic configuration diagram illustrating an embodiment of a transfer system incorporated in an automatic analysis system when viewed from above.

As shown in FIG. 1, an automatic analysis system is constructed by a preprocessing device 100 and an analysis device 200 disposed adjacent to each other. The preprocessing device 100 is a device that performs a preprocess of a sample to be analyzed, and may have a configuration equivalent to that of the preprocessing device disclosed in WO 2016/017042. The analysis device 200 is a device that performs an analysis of a sample subjected to the preprocess in the preprocessing device 100, and may be a liquid chromatograph or the like.

The automatic analysis system incorporates a transfer system 1 that transfers a preprocessed sample from the preprocessing device 100 (transfer source device) to the analysis device 200 (transfer destination device). The preprocessed sample is transferred to the analysis device 200 while being accommodated in a sample container S (see FIG. 3 and the like). In the analysis device 200, the sample in the sample container S transferred by the transfer system 1 is collected by a needle or the like and used for analysis.

The transfer system 1 mainly includes an arm 2, a first catcher 4, a container holder 6, a solenoid 10, a linear guide 12, a motor 14, a second catcher 16, and a controller 22.

The arm 2 is provided so as to extend in a substantially horizontal direction, and a distal end thereof faces the analysis device 200. The first catcher 4 is provided at the distal end of the arm 2. The first catcher 4 can detachably hold the container holder 6 by two claws 4a provided to extend toward the analysis device 200.

Figure 2:
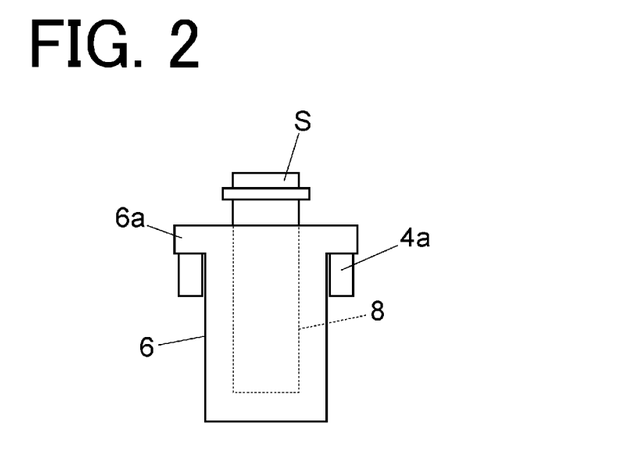
FIG. 2 is a front view of a container holder in the embodiment.

As shown in FIG. 2, the container holder 6 has a hole 8 opened upward, and is set by fitting the sample container S into the hole 8. The container holder 6 includes a flange portion 6a protruding in a substantially horizontal direction from an upper portion of a side face. When the first catcher 4 holds the container holder 6, the claws 4a of the first catcher 4 enter under the flange portion 6a and support the lower face of the flange portion 6a. The solenoid 10 constitutes a lock mechanism that locks/unlocks the holding state of the container holder 6 by the first catcher 4. The lock mechanism will be described later.

Returning to FIG. 1, the description will be continued. The linear guide 12 slides the arm 2 in the axial direction (left-right direction in the figure), and is provided to extend substantially horizontally in the preprocessing device 100. The motor 14 moves the arm 2 by rotating a pinion gear 15 (see FIG. 3) meshing with a rack gear (not illustrated) provided in the arm 2. The linear guide 12 and the motor 14 constitute a drive mechanism that moves the arm 2 in the axial direction.

Figure 3:
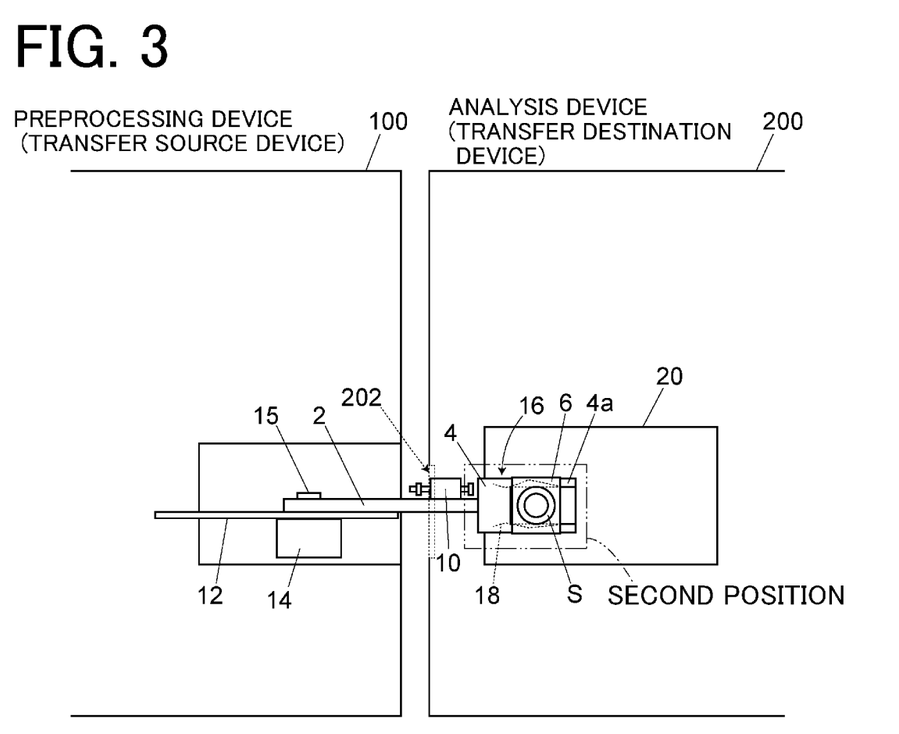
FIG. 3 is a view illustrating a state in which a sample container is transferred to an analysis device in the embodiment.

When the motor 14 is driven, the arm 2 is in a state where the first catcher 4 is disposed at the first position in the preprocessing device 100 and a state where the first catcher 4 is disposed at the second position in the analysis device 200. That is, the arm 2 is axially driven such that the first catcher 4 moves between the first position in the preprocessing device 100 and the second position in the analysis device 200. FIG. 1 illustrates a state in which the first catcher 4 is disposed at the first position, and FIG. 3 illustrates a state in which the first catcher 4 is disposed at the second position.

The second catcher 16 is provided in the analysis device 200. The second catcher 16 is configured to receive and removably hold the container holder 6 from the first catcher 4 when the first catcher 4 of the arm 2 reaches the second position. The second catcher 16 includes an elastic element 18 such as a leaf spring for holding the outer face of the container holder 6 by an elastic force. The second catcher 16 holds the container holder 6 by inserting the container holder 6 into the elastic element 18, and opens the container holder 6 by pulling out the container holder 6 being held toward the preprocessing device 100. That is, the second catcher 16 passively holds and opens the container holder 6.

In the embodiment, the second catcher 16 is provided at an end portion of a sample rack 20 provided in the autosampler which is a component of the analysis device 200. The sample rack 20 is a rack in which a plurality of sample containers each of which accommodates a sample to be analyzed is set. In addition, an opening and closing door 202 for allowing the arm 2 to pass is provided on a wall face of the autosampler of the analysis device 200 on the preprocessing device 100 side. The opening and closing door 202 is pushed open by the arm 2 when the arm 2 of the transfer system 1 moves toward the second catcher 16, and when the arm 2 is in the first state (the state of FIG. 1), the internal space of the autosampler of the analysis device 200 is sealed. In FIG. 3, the opening and closing door 202 is indicated by a broken line to indicate that the opening and closing door 202 is pushed open by the arm 2.

Figure 4:
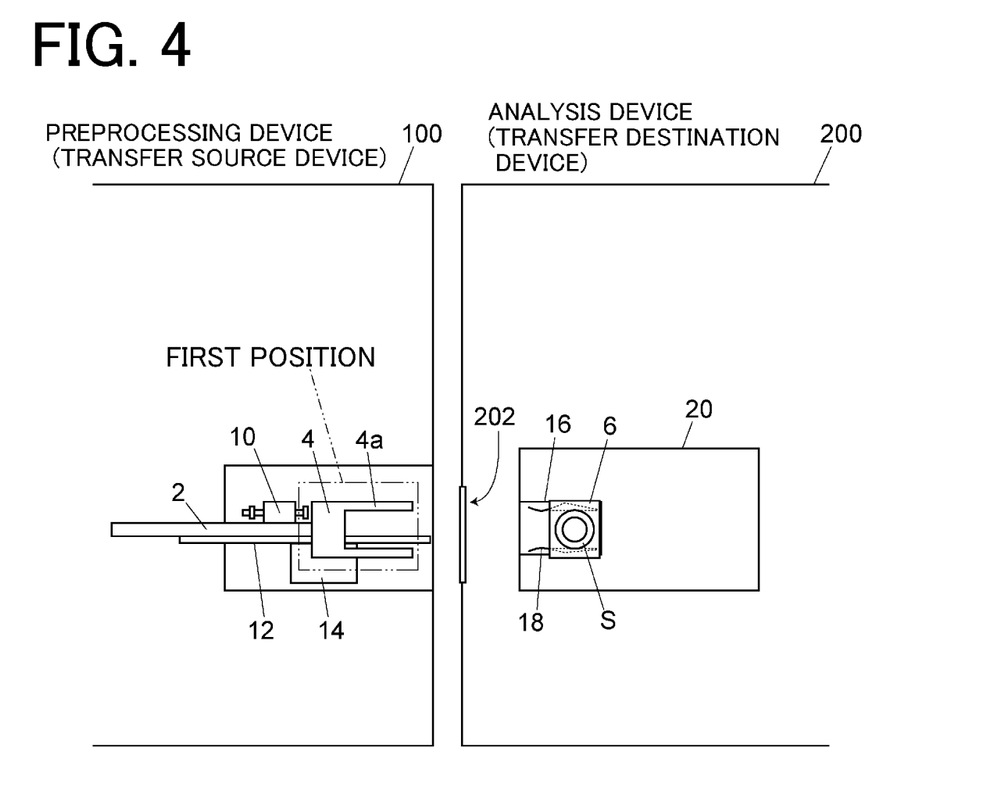
FIG. 4 is a view illustrating a state after the sample container is transferred to the analysis device in the embodiment.

When the arm 2 conveys the container holder 6, the container holder 6 is locked while being held by the first catcher 4 by a lock mechanism including the solenoid 10. When the container holder 6 is conveyed to the second position illustrated in FIG. 3 by the arm 2, the state in which the container holder 6 is held by the first catcher 4 is unlocked. In this state, when the arm 2 is retracted toward the preprocessing device 100, the container holder 6 is left in the analysis device 200 while being held by the second catcher 16 as illustrated in FIG. 4. As a result, while the sample is being collected from the sample container S in the analysis device 200, the arm 2 is retracted into the preprocessing device 100, whereby the opening and closing door 202 can be closed.

Figure 5:
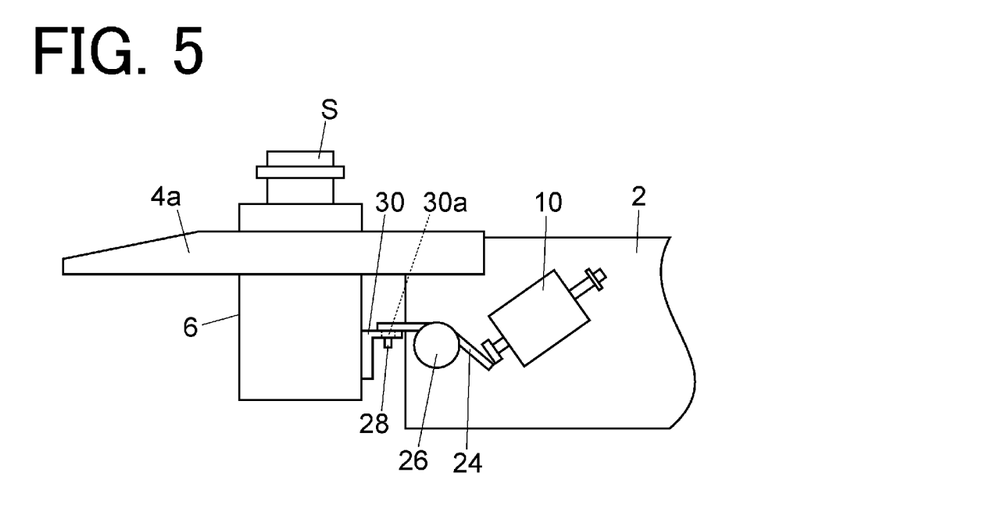
FIG. 5 is a view for explaining the structure of a lock mechanism in the embodiment, and is a view illustrating a state in which the holding of the container holder by a first catcher is locked.
Figure 6:
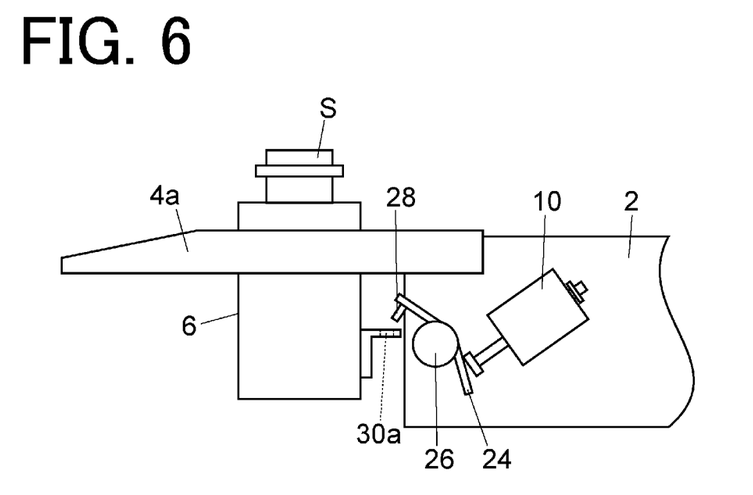
FIG. 6 is a view for explaining the structure of the lock mechanism in the embodiment, and is a view illustrating a state in which the holding of the container holder by the first catcher is unlocked.

As illustrated in FIGS. 5 and 6, the lock mechanism for locking/unlocking the holding of the container holder 6 by the first catcher 4 includes the solenoid 10, a bar 24, a shaft 26, a lock pin 28, and a fixing metal fitting 30. The bar 24 is turnably supported by the shaft 26. The solenoid 10 is provided so as to press one end of the bar 24 when the solenoid 10 is turned on, and the position of the other end of the bar 24 is displaced when the solenoid 10 is turned on and off. The lock pin 28 is attached to one end of the bar 24. The fixing metal fitting 30 is attached to the back face of the container holder 6 (the face facing the proximal end of the arm 2). The fixing metal fitting 30 extends substantially horizontally from the plane of the container holder 6. The fixing metal fitting 30 is provided with a through hole 30a into which the lock pin 26 of the bar 24 is inserted.

As illustrated in FIG. 5, when the solenoid 10 is turned off while the container holder 6 is held by the first catcher 4, the lock pin 28 is inserted into the through hole 30a of the fixing metal fitting 30, and the container holder 6 is locked while being fixed to the first catcher 4. Then, when the solenoid 10 is turned on, as illustrated in FIG. 6, the lock pin 28 is pulled out from the through hole 30a of the fixing metal fitting 30, and the state in which the container holder 6 is fixed to the first catcher 4 is unlocked. This state is a state in which the container holder 6 can be detached from the first catcher 4.

Operations of the motor 14 constituting the drive mechanism and the solenoid 10 constituting the lock mechanism are controlled by the controller 22. The controller 22 is realized by an electronic circuit including a CPU and the like. Such an electronic circuit may be realized by an electronic circuit provided in the preprocessing device 100 to control the operation of each component of the preprocessing device 100. Note that the configuration of the lock mechanism is not limited to that described here, and may have another mechanical or electromagnetic configuration.

Figure 7:
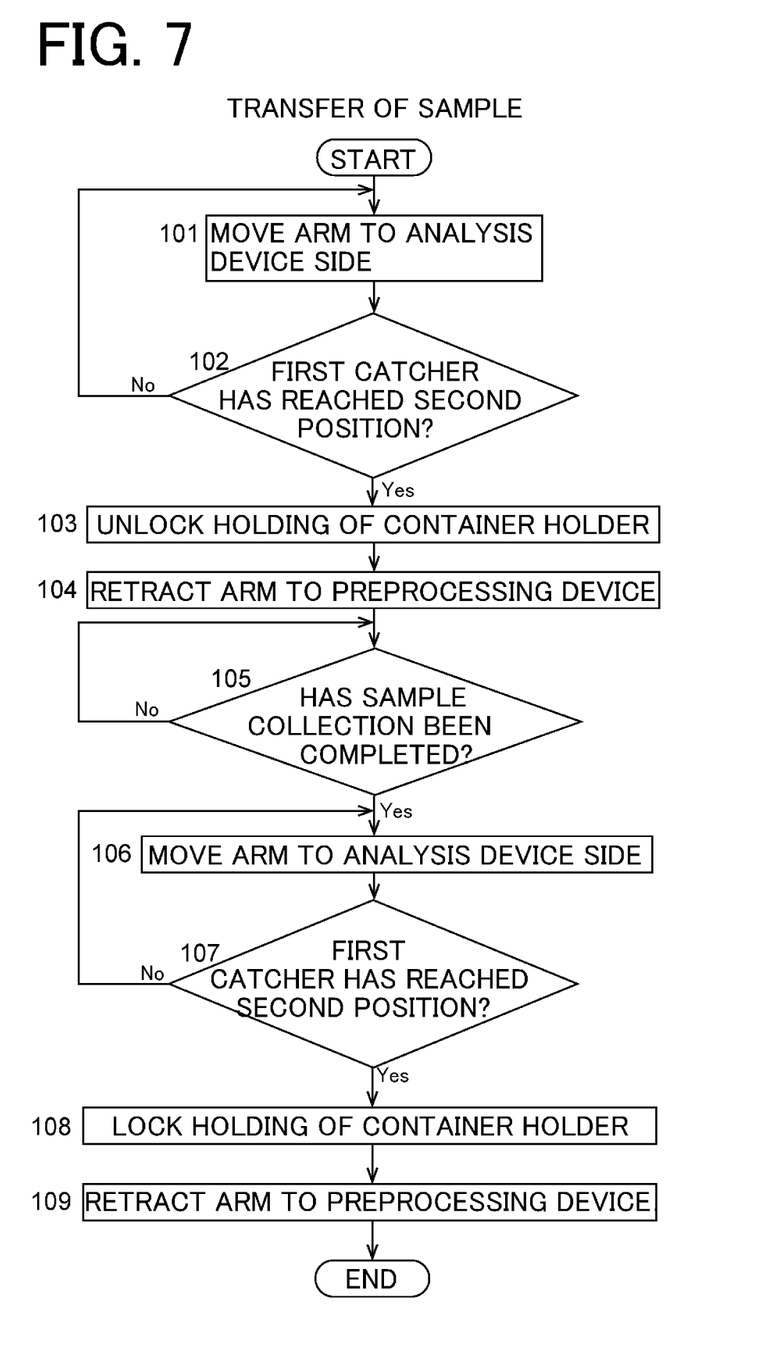
FIG. 7 is a flowchart illustrating an example of a sample transfer operation from the preprocessing device to the analysis device in the embodiment.

An example of a sample transfer operation from the preprocessing device 100 to the analysis device 200 realized by the controller 22 will be described with reference to the flowchart of FIG. 7 together with FIGS. 1, 3, and 4.

When the preprocess of the sample to be analyzed is completed in the preprocessing device 100, the preprocessed sample is set in the container holder 6 held by the first catcher 4 waiting at the first position in a state of being accommodated in the sample container S. When the sample container S is set in the container holder 6, the controller 22 moves the arm 2 toward the analysis device 200 until the first catcher 4 reaches the second position in the analysis device 200 (steps 101 and 102).

When the first catcher 4 reaches the second position in the analysis device 200, the container holder 6 is held by the second catcher 16 (see FIG. 3). In this state, the controller 22 unlocks the holding of the container holder 6 by the first catcher 4 (step 103), and retracts the arm 2 to the preprocessing device 100 (step 104). The sample container S held by the container holder 6 together with the container holder 6 is left in the analysis device 200 (see FIG. 4). In the analysis device 200, a sample in the sample container S is collected using a needle. The controller 22 causes the arm 2 to stand by in the preprocessing device 100 until the collection of the sample from the sample container S in the analysis device 200 is completed (step 105). Whether the collection of the sample from the sample container S in the analysis device 200 is completed can be detected based on a signal from a controller (not illustrated) that integrally manages the preprocessing device 100 and the analysis device 200.

When the collection of the sample from the sample container S in the analysis device 200 is completed, the controller 22 again moves the arm 2 toward the analysis device 200 until the first catcher 4 reaches the second position in the analysis device 200 (steps 106 and 107). When the first catcher 4 reaches the second position in the analysis device 200, the container holder 6 is held by the first catcher 6 (see FIG. 3). In this state, the controller 22 locks the holding of the container holder 6 by the first catcher 4 (step 108), and retracts the arm 2 to the preprocessing device 100 (step 109). As a result, the container holder 6 held by the first catcher 4 is detached from the second catcher 16 and returned to the preprocessing device 100 together with the sample container S. As a result, the transfer of the sample from the preprocessing device 100 to the analysis device 200 is completed. Thereafter, the used sample container S returned to the preprocessing device 100 is conveyed to the disposal port by another conveyance mechanism provided in the preprocessing device 100 and discarded.

Note that the embodiment described above merely illustrates an example of an embodiment of the transfer system and the automatic analysis system according to the present invention. Embodiments of the transfer system and the automatic analysis system according to the present invention are as follows.

In an embodiment of a transfer system according to the present invention, in a transfer system that transfers a sample container containing a sample from a transfer source device to a transfer destination device disposed adjacent to the transfer source device, the transfer system includes an arm having a distal end and a proximal end, the distal end facing the transfer destination device, the arm having, at a distal end portion, a first catcher for detachably holding the sample container, a drive mechanism that is provided in the transfer source device and is configured to move the first catcher between a first position in the transfer source device and a second position in the transfer destination device by driving the arm, and a second catcher that is provided in the transfer destination device, and the second catcher being provided so that the sample container is delivered and received between the second catcher and the first catcher when the first catcher reaches the second position.

In a first aspect of the embodiment of the transfer system, the transfer system further includes a controller configured to control an operation of the drive mechanism to move the first catcher to the first position immediately after the sample container is delivered from the first catcher to the second catcher. With such an aspect, a time during which the arm accesses the inside of the transfer destination device is shortened.

In the first aspect, the arm may include a lock mechanism configured to perform locking and unlocking of holding of the sample container by the first catcher, and wherein the controller may be configured to control the lock mechanism to perform the unlocking at the time when the sample container is delivered from the first catcher to the second catcher.

In the above case, the controller may be configured to perform the locking when the sample container is delivered from the second catcher to the first catcher.

The lock mechanism may include a solenoid for switching between the locking and the unlocking.

Further, in a second aspect of the embodiment of the transfer system, the second catcher is configured to passively hold the sample container using an elastic force of an elastic element. According to such an aspect, the structure of the second catcher is simple, and the cost required for the transfer system can be reduced. This second aspect can be combined with the first aspect.

In a third aspect of the embodiment of the transfer system, the transfer system includes a container holder in which the sample container is set, and wherein the first catcher and the second catcher are configured to detachably hold the sample container in a state of being set in the container holder. As described above, by adopting an aspect in which the sample container is left in the transfer destination device together with the container holder in which the sample container is set, it is not necessary to take out the sample container from the container holder when transferring the sample container from the transfer source device to the transfer destination device, so that the system configuration is simplified and the cost can be reduced.

In an embodiment of an automatic analysis system according to the present invention, the automatic analysis system includes a transfer source device, a transfer destination device disposed adjacent to the transfer source device, and a transfer system described above that transfers a sample container containing a sample from the transfer source device to the transfer destination device.

In the embodiment of the automatic analysis system, the transfer system may include a container holder in which the sample container is set, wherein the transfer source device may be a processing device configured to perform a predetermined process on a sample and to set a sample container containing the sample subjected to the predetermined process in the container holder of the transfer system at a first position in the transfer source device, and wherein the transfer destination device may be an analysis device configured to collect the sample from the sample container transferred from the transfer source device into the transfer destination device by the transfer system and to analyze the collected sample.

DESCRIPTION OF REFERENCE SIGNS

1: transfer system
2: arm
4: first catcher
4a: claw
6: container holder
6a: flange portion
8: hole
10: solenoid
12: linear guide
14: motor
15: pinion gear
16: second catcher
18: elastic element
20: sample rack
22: controller
24: bar
26: shaft
28: lock pin
30: fixing metal fitting
30a: through hole
100: preprocessing device (conveyance source device)
200: analysis device (conveyance destination device)
202: opening and closing door
S: sample container

What is claimed is:

1. An automatic analysis system comprising:
a transfer source device;
a transfer destination device disposed adjacent to the transfer source device, and having an internal space and a door provided so as to open and close an opening leading to the internal space; and
a transfer system that transfers a sample container containing a sample from the transfer source device to the transfer destination device, wherein the transfer system comprises:
an arm having a distal end and a proximal end, the distal end facing the transfer destination device, the arm having, at a distal end portion, a first catcher for detachably holding the sample container;
a drive mechanism that is provided in the transfer source device and is configured to move the first catcher between a first position in the transfer source device and a second position in the internal space of the transfer destination device by driving the arm, wherein the first position and the second position are in the same horizontal plane, and the drive mechanism is configured to move the first catcher only horizontally; and
a second catcher that is provided in the internal space of the transfer destination device, and the second catcher being provided so as to receive the sample container from the first catcher by catching the sample container, which has been moved horizontally from the first position to the second position through the opening of the transfer destination device, passively.

2. The automatic analysis system according to claim 1, further comprising a controller configured to control an operation of the drive mechanism to begin to move the first catcher to the first position immediately after the sample container is delivered from the first catcher to the second catcher.

3. The automatic analysis system according to claim 2, wherein
the arm includes a lock mechanism configured to perform locking and unlocking of holding of the sample container by the first catcher, and
the controller is configured to control the lock mechanism to perform the unlocking at the time when the sample container is delivered from the first catcher to the second catcher.

4. The automatic analysis system according to claim 3, wherein the controller is configured to perform the locking when the sample container is delivered from the second catcher to the first catcher.

5. The automatic analysis system according to claim 3, wherein the lock mechanism includes a solenoid for switching between the locking and the unlocking.

6. The automatic analysis system according to claim 1, wherein the second catcher is configured to passively hold the sample container using an elastic force of an elastic element.

7. The automatic analysis system according to claim 1, wherein
the transfer system includes a container holder in which the sample container is set, and
the first catcher and the second catcher are configured to detachably hold the sample container in a state of being set in the container holder.

8. The automatic analysis system according to claim 1, wherein
the transfer system includes a container holder in which the sample container is set,
the transfer source device is a processing device configured to perform a predetermined process on a sample and to set a sample container containing the sample subjected to the predetermined process in the container holder of the transfer system at the first position in the transfer source device, and
the transfer destination device is an analysis device configured to collect the sample from the sample container transferred from the transfer source device into the transfer destination device by the transfer system and to analyze the collected sample.

* * * * *